(No Model.) 4 Sheets—Sheet 1.
L. D. SWART.
SELF FEEDER FOR CORN HUSKING MACHINES.
No. 596,921. Patented Jan. 4, 1898.
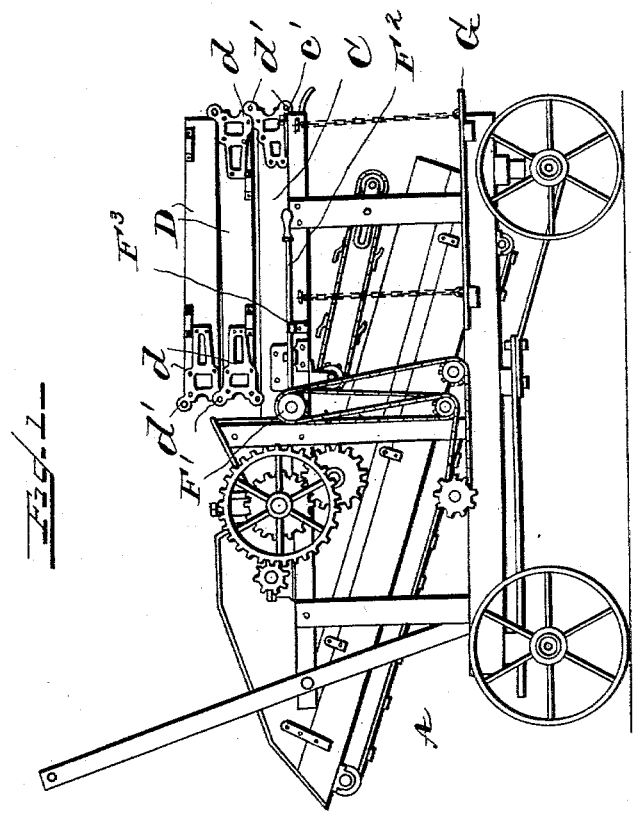

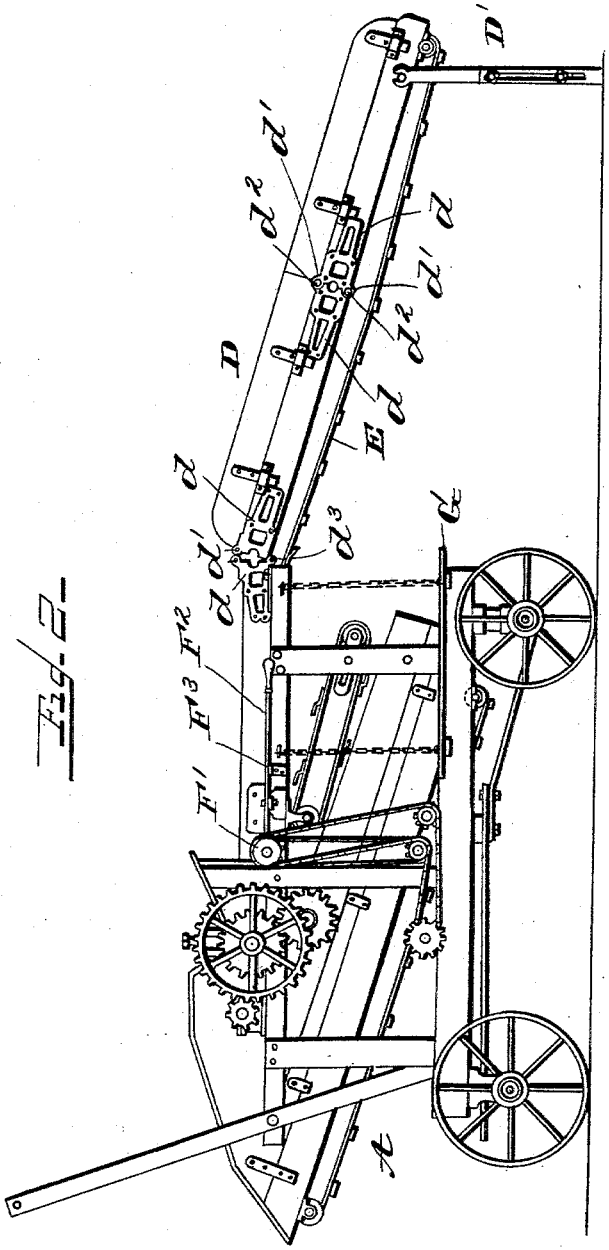

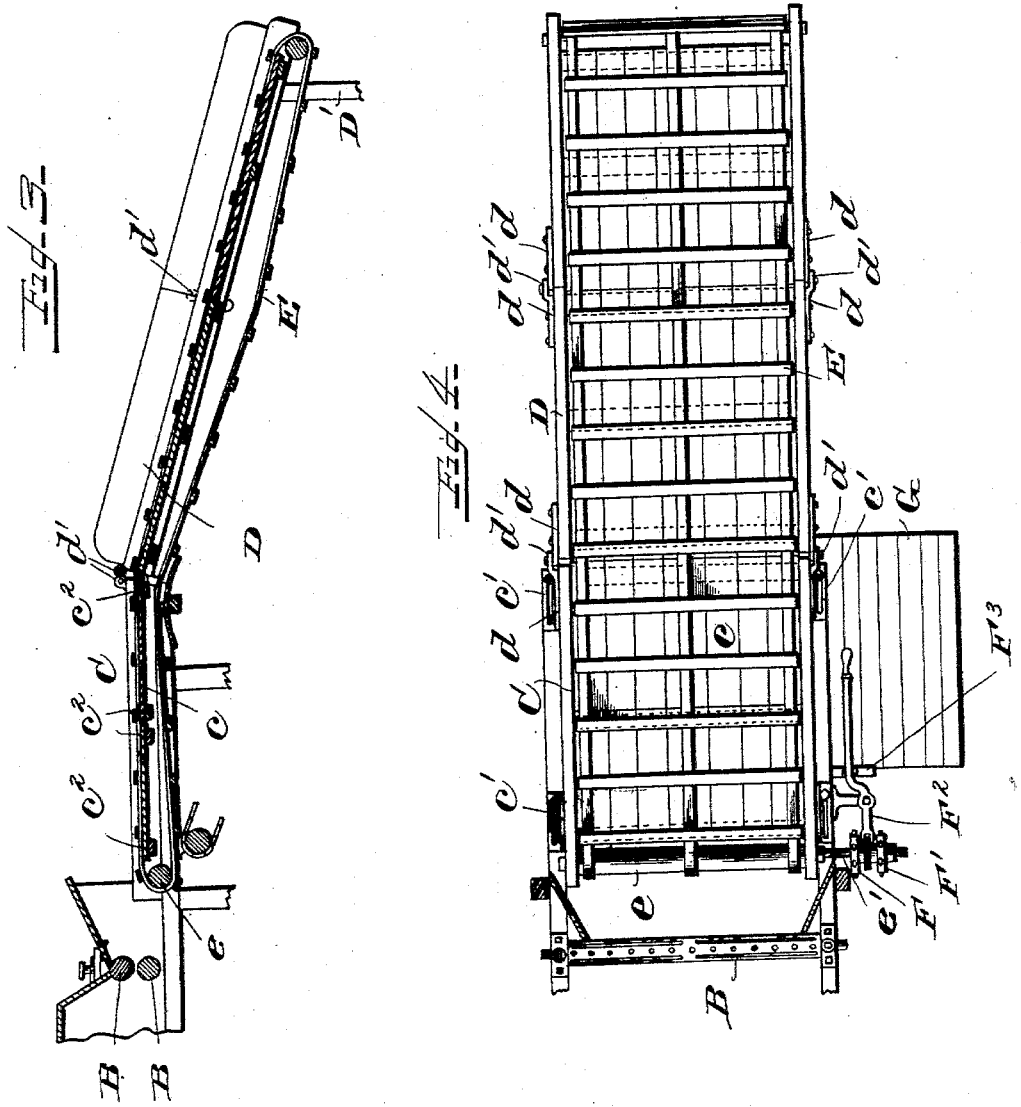

(No Model.) 4 Sheets—Sheet 4.
L. D. SWART.
SELF FEEDER FOR CORN HUSKING MACHINES.
No. 596,921. Patented Jan. 4, 1898.
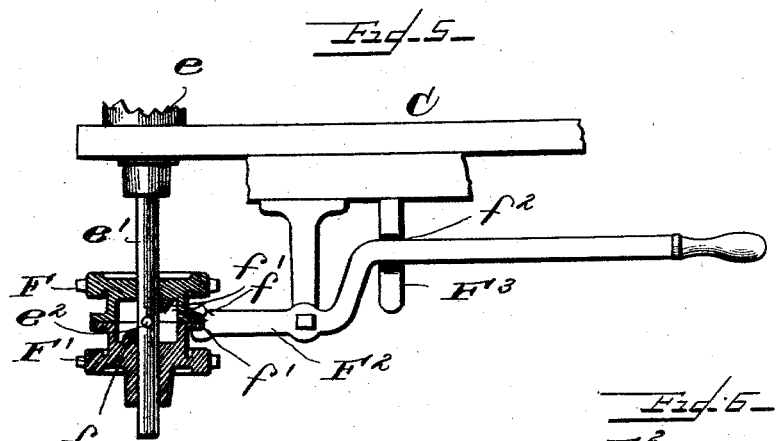
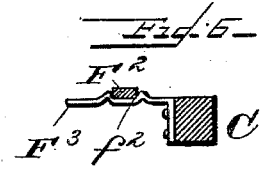
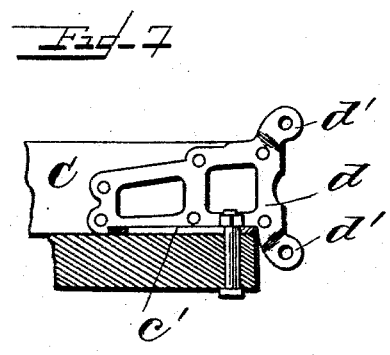
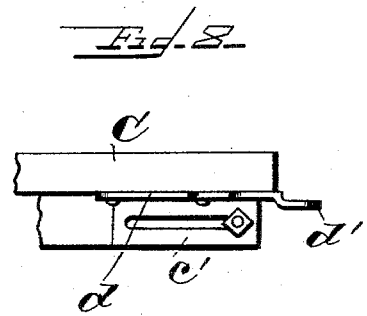
Witnesses
G. A. Tauberschmidt,
J. D. Kingsbury.
Inventor
Lester D. Swart
By Whitaker & Prevost
Attys.

UNITED STATES PATENT OFFICE.

LESTER D. SWART, OF AUBURN, NEW YORK, ASSIGNOR TO THE A. W. STEVENS & SON, OF SAME PLACE.

SELF-FEEDER FOR CORN-HUSKING MACHINES.

SPECIFICATION forming part of Letters Patent No. 596,921, dated January 4, 1898.

Application filed May 14, 1897. Serial No. 636,521. (No model.)

*To all whom it may concern:*

Be it known that I, LESTER D. SWART, a citizen of the United States, residing at Auburn, in the county of Cayuga and State of New York, have invented certain new and useful Improvements in Self-Feeders for Corn-Husking Machines; and I do hereby declare the following to be a full, clear, and exact description of the invention, such as will enable others skilled in the art to which it appertains to make and use the same.

My invention consists in the novel features hereinafter described, reference being had to the accompanying drawings, which illustrate one form in which I have contemplated embodying my invention, and said invention is fully disclosed in the following description and claims.

Referring to the said drawings, Figure 1 represents a side elevation of the machine, showing the feeder folded for transportation. Fig. 2 is a similar view showing the feeder in position for use. Fig. 3 represents a vertical sectional view through the feeding-table and feeder. Fig. 4 is a top plan view of the same. Fig. 5 is a detail view, partly in section, showing the mechanism for starting the feeding-belt. Fig. 6 is a detail view of a portion of the mechanism. Figs. 7 and 8 are detail views of one of the devices for adjusting the feeding-table longitudinally.

Referring to the drawings, A represents a corn-husking machine which is provided with suitable devices for separating ears of corn and removing the husks therefrom, including a pair of snapping-rollers B B, to which the cornstalks are directly fed.

C represents the feeding-table, which is supported upon the frame of the machine and is adjustable toward and from the snapping-rollers B B. In this instance the feeding-table consists of a rectangular horizontal frame provided with a smooth bottom $c$, (see Fig. 3,) over which the raddle-belt which feeds the stalks to the machine slides. The frame of the feeding-table is provided adjacent to each of its corners with a horizontal slotted plate $c'$, which rests upon a stationary part of the frame of the machine and to which it is secured by a bolt passing through the slot of the plate. By loosening these bolts the feeding-table can be moved longitudinally toward or from the snapping-rollers. The object of this construction is to enable the "throat" of the machine or space between the end of the feeding-table and the snapping-rollers to be varied to suit the quality of corn being husked. In husking short or dry corn the throat can be narrowed; but more room is needed for long or slightly-green corn, or that in which the ears are particularly large or long.

The bottom $c$ of the feeding-table is preferably made in sections, one or more of which can be removed to give access to the husking-rolls and other devices beneath. For this purpose they may be conveniently supported upon cleats $c^2$, as shown, or other supports, as found most convenient, and they may be detachably secured in position by bolts or screws, if found necessary or desirable.

D represents the folding carrier-frame, which is preferably made in two sections hinged together, the first section being hinged to the adjustable feeding-table. In connecting these parts together I prefer to employ hinge-sections $d\ d$, which are secured to the meeting ends of the carrier-sections and the feeding-table. Each of these hinge-sections is provided with two pivotal apertures $d'\ d'$ for the reception of a pivot-pin. By placing the pivotal pins in one or the other of these apertures in the plates the sections can be hinged from opposite sides, as will be readily seen, and by placing a pin in both apertures of a pair of adjacent hinge-plates the parts so connected will be held rigidly together. In Fig. 2 the carrier is shown in operative position, in which the pins $d^2\ d^2$ are placed in engagement with both apertures of the hinge-plates of the two carrier-sections, and the pin $d^3$ is placed in the lower hole of the hinge-sections connecting the carrier to the feeding-table. In order to fold up the carrier for transportation, it is only necessary to change the pins $d^3$ from the lower to the upper holes in their hinge-sections and remove the lower pins $d^2\ d^2$, when the carrier can be folded upon itself and upon the feeding-table in very compact form, as shown in Fig. 1. When extended, the outer end of the carrier is supported by adjustable legs $D'\ D'$. (See Fig. 3.)

E represents the raddle-belt or conveyer, which extends around the carrier and feeding-table, being driven by a drum $e$ adjacent to the snapping-rollers B B. In order to keep the under side of the belt from hanging down, so as to interfere with other parts of the apparatus, the feeding-table is preferably provided at its rear end with two or more curved runners or guides.

The shaft $e'$ of the drum $e$ is provided with means for driving the drum in either direction and for disconnecting the shaft from the driving mechanism, so that the raddle-belt or conveyer is at all times under the control of the operator. In this instance the shaft $e'$ is provided with two loose sprocket-wheels F F', which are driven in opposite directions by means of sprocket-chains from suitable shafts provided on the machine. The shaft $e'$ is provided with a lug or feather $e^2$, which is adapted to engage a projecting portion $f$ on either of said wheels F F' when one or the other is moved on longitudinally of the shaft into engagement with said lug $e^2$. The wheels F F' are so constructed that a space is left between the projections $f$ of the same and the lug $e^2$ sufficient to allow the wheels F F' to turn freely without engaging the lug $e^2$. Each wheel F F' is provided with a flange $f'$, the said flanges $f'$ $f'$ being adjacent to each other, and a pivoted operating-lever F² is secured to the main frame of the machine and has a forked portion engaging the flanges $f'$ $f'$ of the wheels F F'. By means of this lever the said wheels can be moved so as to cause the shaft $e$ to revolve in either direction or to disconnect it from the driving mechanism at will. The lever F² is preferably extended horizontally in a direction away from the snapping-rollers, so that the operator can control the conveyer or raddle-belt without danger from said rollers.

In order to enable the operator to accurately control the conveyer, I prefer to provide a spring locking-arm F³, secured to the machine and provided with a notch or recess $f^2$ for holding the lever in its central position with both wheels F F' out of engagement with the shaft $e$, as shown in detail in Figs. 5 and 6.

G represents a platform secured to the machine adjacent to and below the rear end of the feeding-table for the operator to stand upon while the machine is in operation. It will be seen that if the corn is being fed too rapidly the operator can instantly stop the conveyer or reverse it, so as to withdraw the corn from the machine and thus prevent choking, and if the corn is not properly laid upon the raddle-belt or conveyer he can reverse the movement of the belt before it reaches the snapping-rollers and run it all off of the conveyer. The corn will be spread from the bundles at the outer end of the carrier, which can be supported at any desired level to facilitate the reception of the stalks.

What I claim, and desire to secure by Letters Patent, is—

1. In a corn-husking machine, the combination with the husking mechanism, including snapping-rollers, of a feeding-table and means for adjusting the feeding-table toward and from the snapping-rollers, substantially as described.

2. In a corn-husking machine, the combination with the husking mechanism, including snapping-rollers, of a feeding-table, means for adjusting the feeding-table toward and from the snapping-rollers, and a vertically-adjustable carrier pivotally connected to said feeding-table, substantially as described.

3. In a corn-husking machine, the combination with the husking mechanism, including snapping-rollers, of a feeding-table, means for adjusting the feeding-table toward and from the snapping-rollers, a vertically-adjustable carrier pivotally connected to said feeding-table and a single conveyer passing over said carrier and feeding-table, substantially as described.

4. In a corn-husking machine the combination with the husking mechanism including snapping-rollers, of a feeding-table, a conveyer passing over said feeding-table, oppositely-driven wheels on the shaft of said conveyer normally disconnected therefrom, means for driving said wheels continuously from a shaft of the machine, and a lever connected with both of said wheels and adapted to throw one or the other into engagement with the conveyer-shaft, substantially as described.

5. In a corn-husking machine, the combination with the husking mechanism, of a feeding-table, a conveyer on said table, a pair of oppositely-driven wheels on the conveyer-shaft, each provided with a flange on its inner side, said wheels being loosely mounted on said shaft and each provided with a part adapted to engage a part secured to said shaft, and a lever having a forked end engaging the flanges of said wheels, for throwing one or the other of said wheels into engagement with the conveyer-shaft, substantially as described.

6. In a corn-husking machine the combination with the husking mechanism, of a feeding-table, a conveyer on said table, a pair of oppositely-driven wheels on the conveyer-shaft loosely mounted thereon, and provided each with a projection to engage a projection on said shaft, a reversing-lever having a portion engaging both wheels and a locking device for said lever normally holding both of said wheels out of engagement with the conveyer-shaft, substantially as described.

7. In a corn-husking machine the combination with the husking mechanism, of a feeding-table, a carrier pivotally secured thereto, a single endless conveyer extending around the table and carrier, driving mechanism for said conveyer and reversing mechanism for said conveyer, substantially as described.

8. In a corn-husking machine the combination with the husking mechanism, of a feeding-table, a carrier pivotally secured thereto, a single endless conveyer extending around said table and carrier, a pair of oppositely-driven wheels on the driving-shaft of said conveyer normally disconnected therefrom, each provided with means for engaging a part secured to said shaft, and means for moving said wheels into and out of engagement with said shaft to drive the conveyer in either direction or to disconnect it from its driving mechanism, substantially as described.

9. In a corn-husking machine, the combination with the husking mechanism including snapping-rollers, of a feeding-table adjustable toward and from said snapping-rollers, a carrier pivotally secured to said feeding-table, a single endless conveyer engaging said carrier and feeding-table, means for driving said conveyer, and reversing mechanism for said conveyer, substantially as described.

In testimony whereof I affix my signature in presence of two witnesses.

LESTER D. SWART.

Witnesses:
E. F. STEVENS,
ROBT. AIKEN, Jr.